INVENTOR
JOSEPH P. STINE
BY
Mason, Mason & Albright
ATTORNEYS

Oct. 6, 1970    J. P. STINE    3,531,924
FRUIT-PICKING ATTACHMENT WITH CUTTER BLADES
Filed Dec. 8, 1967    3 Sheets-Sheet 2

INVENTOR
JOSEPH P. STINE
BY
Mason, Mason & Albright
ATTORNEYS

Oct. 6, 1970     J. P. STINE     3,531,924
FRUIT-PICKING ATTACHMENT WITH CUTTER BLADES
Filed Dec. 8, 1967     3 Sheets-Sheet 3

INVENTOR
JOSEPH P. STINE
BY
Mason, Mason & Albright
ATTORNEYS

United States Patent Office 3,531,924
Patented Oct. 6, 1970

3,531,924
FRUIT-PICKING ATTACHMENT WITH
CUTTER BLADES
Joseph P. Stine, P.O. Box 2513,
Orlando, Fla. 32802
Continuation-in-part of application Ser. No. 651,792,
July 7, 1967. This application Dec. 8, 1967, Ser. No.
689,093
Int. Cl. A01g 19/00
U.S. Cl. 56—328
22 Claims

ABSTRACT OF THE DISCLOSURE

A picking attachment for fruit having a pair of forward projections with a slot therebetween having a width less than the diameter of the fruit harvested, the slot narrowing to a channel for receiving the stem of the fruit, a pair of toothed overlapping freely rotatable disc blades extending under the channel, the stem being brought into the depression between a pair of teeth of each blade by the forword relative movement of the attachment, the blades being rotated by the relative movement of the stem whereby the depressions close in on each other to shear the stem at a place proximate to the fruit immediately above its calyx.

CROSS REFERENCES TO RELATED APPLICATIONS

This application is a continuation-in-part of my application Ser. No. 651,792, filed July 7, 1967, for a "Mobile Fruit Harvester."

BACKGROUNND OF THE INVENTION

If a fruit is separated from its stem at the calyx without clipping, an opening in the skin or peeling may result through which harmful foreign organisms may enter and produce decay. For this reason the longevity of harvested fruit is improved by clipping the fruit from the stems. In the citrus fruit industry, the clipping of some thin-skinned fruit is considered mandatory for this reason. With citrus fruit having a thicker peel, clipping of the fruit is not considered necessary but is still desirable if it can be economically performed.

In my above-noted copending application for "Mobile Fruit Harvester," an apparatus is disclosed wherein a mobile frame has vertical rotatable members with picking means extending outwardly therefrom which are adapted to comb through a fruit-bearing plant to remove the fruit. These fruit-picking attachments which extend from the rotatable member include a plurality of projections defining a plurality of slots having sufficient width to receive the stems of the fruit to be harvested. The slot terminates in a barrier which may be the end of the slot or a wire stretched across its after portion. The relative movement of the fruit-picking attachment pulls the stem against the barrier at the same time maintaining the fruit in more or less perpendicular position by holding means disposed on the projections. When the stem meets the barrier, it is bent to create a stress at the calyx due to which the stem parts from the fruit at the calyx. It would be preferable, however, in most instances, to clip rather than tear the stem immediately above its calyx. This is particularly true for fruit which is to be eaten fresh.

Unfortunately, in the past several years, there has not been an adequate labor force available for the clipping of fruit by hand and thus for economical reasons, this method of harvesting has been largely eliminated except in those situations where it is considered a complete necessity. Since at present there are no commercially available mechanical clipping harvesters, the clipping operation where accomplished is by hand.

From the foregoing, it will be appreciated that a need exists for apparatus and methods for the rapid harvesting of fruit of an economical and effective character which will clip the fruit in such a manner that the amount of stem remaining with the fruit is minimal and the fruit is not otherwise injured as to render it more susceptible to decay action.

SUMMARY OF THE INVENTION

The invention in this case relates principally to a mechanism for harvesting fruit by clipping the stem of the fruit while attached to a tree and depositing the fruit in a convenient collecting device. Preferably, it is utilized as part of a mobile fruit harvester as described in my above-noted related application. Also, a modified embodiment of the invention may be incorporated in a hand picker.

The mechanism is designed to harvest fruit by clipping the stem immediately above the calyx while moving the horizontal clipping attachment through the canopy of the fruit-bearing tree. A number of attachments are affixed to a rotating member in an arrangement similar to the steps of a spiral staircase, and the rotating member includes a helical spiral chute which underlies the attachments. By rotating the various pickers through the canopy of the fruit tree while simultaneously moving it forward, fruit located in the canopy may become vulnerable to receipt in a slot of the picking attachment on several occasions. As the attachment moves through the tree canopy, the fruit is received in slots of the attachment with the fruit on their underside with the stems extending through the slots. The fruits bear on devices under the projections to maintain them in a more or less upright orientation while the stem is brought into two serrated disc cutter blades. As the stem in pulled to the rearward, in the relative sense, by the attachment's motion, the teeth of the blades embrace and shear he stems and the fruit members drop to the underlying helical chute.

In a modified form of the invention, the rotating disc blades are utilized in a device having a single slot for a hand-picking operation.

The principal object of this invention is to provide, for a mobile fruit harvester having a continuous forward motion which combs a fruit tree's canopy as the harvester moves along with a plurality of fruit-picking attachments, a fruit-picking attachment which automatically clips the fruit immediately above the fruit's calyx.

Further objects, adaptabilities, and capabilities will appear as the description progresses, reference being had to the accompanying drawings, in which:

DESCRIPTION OF THE PREFERRED EMBODIMENTS

Figure 1:
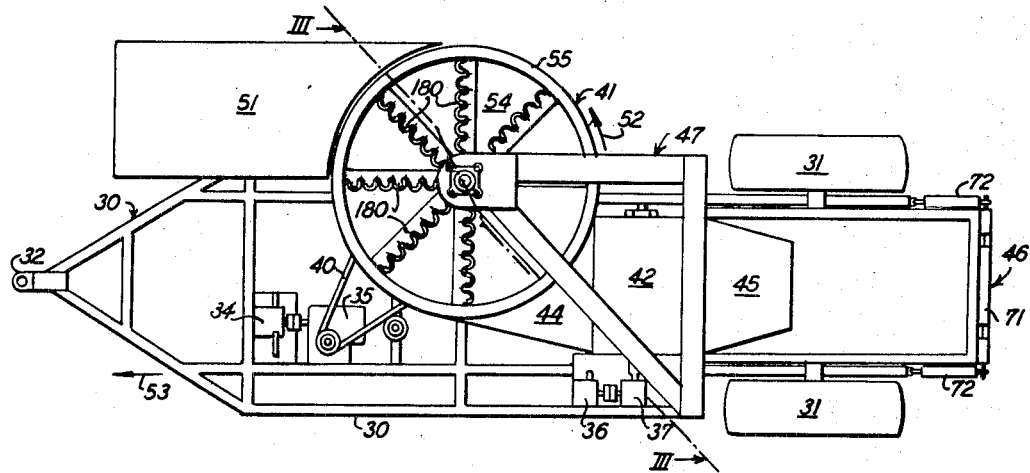
FIG. 1 is a top view of the mobile fruit harvester which incorporates the picking attachment of the invention.

Referring to FIG. 1, a main frame 30, composed of structural steel, comprises the chassis of a trailer which carries and supports the fruit harvester. The rear wheels 31 may, if desired, be steerable, the specific mechanism not being shown as unnecessary for an understanding of the use of the invention by a person skilled in the art. The unit shown in the figures is provided with a trailer hitch 32 for connection to a tractor or other pulling vehicle. Although the forward speed of the unit is variable, it will be understood that the speed is generally less than one hundred feet per minute. The power supply for the unit shown in the figure may be from a tractor power take-off or a power unit mounted on the trailer. Although any conventional and widely known power conveyance system may be employed, the hydraulic system is preferred. Whatever power system is utilized activates a motor 34 and the elevator motor 36. The motor 34 drives a rotor member 41 through a power train which includes a worm gear reducer 35, a roller chain 40 and a driven sprocket 61. The motor 36, connected through the worm gear speed reducer 37, powers an elevator 42 which transports fruit from a catch basin 44 to a discharge chute 45 and thence to the fruit bin 46. The rotor member 41 is maintained in a vertical position by a top brace 47 which is affixed to the frame 30. Picking attachments 180 extend radially outwardly from the axis of the rotor member 41. A limb pick-up ramp 51 is attached to the frame 30 on the lower edge from the right-hand side to guide low-lying limbs into the path of the rotor member 41. The arrow 52 indicates the direction of normal rotation of the rotor 41 and arrow 53 indicates the direction of travel of the harvester.

It will be understood that the helical spiral of the rotor member 41 is constructed of sheet metal material which is initially cut into circular sheets between six and nine feet in diameter with a concentric hole and a radial cut. These sheets are rolled into a helical spiral having a pitch of approximately two feet and are connected together to form the bottom portions 54 of the flights of the rotor member 41. The periphery of the rotor member 41 is formed by a spiral pipe 55 which is of a diameter somewhat larger than that of the maximum size of the fruit being picked so that there is sufficient room for the fruit to roll under the picking attachments 180 along bottom portions 54 of rotor member 41. The bottom portions 54 are welded or otherwise secured to the center pipe 56 and the spiral pipe 55 for rigidity and support. The center pipe 56 has a shaft welded in each of its ends to fit into a thrust bearing 57 at its bottom and a support bearing 58 at the top of the device. The bottom thrust bearing 57 is bolted or otherwise affixed to the main frame 30 and the top support bearing 58 is similarly secured to the top brace 47.

The large driven sprocket 61 is affixed to the lower shaft of the rotor member 41 above the thrust bearing 57. Although the speed of the rotor member 41 is variable, preferably it operates at approximately ten revolutions per minute. It is to be appreciated from the figures that the the rotor member 41 has a left-hand pitch and moves counterclockwise, when viewed from the top, so that when it passes through the canopy of a tree a lifting action takes place. The rotor member 41 is preferably about tree high and, since it is approximately six to nine feet in diameter, is capable of penetrating two to four feet into the canopy of the tree without undue interference from the center pipe 56.

The catch basin 44 surrounds the bottom of the rotor member 41 to receive fruit as it discharges from the bottom flight portion 54. The floor of catch basin 44 descends to the rear so that the fruit is conveyed by gravity to elevator 42. Catch basin 44 is of sufficient size to allow for accumulation of the fruit when the elevator 42 is overloaded.

Elevator 42 is conventional in design and includes buckets 65 which convey the fruit to a height above the temporary storage fruit bin 46 and discharge the fruit into such bin through the discharge chute 45. Power for the elevator 42 is supplied by motor 36 through a worm gear reducer 37 and is adapted to give elevator 42 the correct speed to handle the anticipated maximum volume of fruit from the catch basin 44 without injury.

The fruit bin 46 in designed to hold approximately seventy cubic feet (or two tons) of fruit. It is constructed of an angle iron frame 66 with expanded metal sides 67. Its floor 70 is sloped to the rear so that the fruit may escape through the dump gate 71 when it is opened by means of hydraulic cylinders 72. The fruit bin 46 is supported in such a manner that it may be lifted on a lift track 74 which comprises part of the main frame 30.

When it is desired to discharge fruit from the bin 46 into a truck or other waiting conveyance, the conveyance is appropriately positioned under gate 71, the fruit bin 46 having been previously lifted on the lift track 47. Hydraulic cylinders 72 are actuated to open the dump gate 71 and fruit in the fruit bin 46 transfers by gravity into the storage space of the proximate conveyance. When the unloading of the fruit bin 46 is completed, it is lowered. During the picking operation, the fruit bin 46 is kept in its lowered position so that fruit from the elevator buckets 65 may be received in a discharge chute 45.

Figure 3:
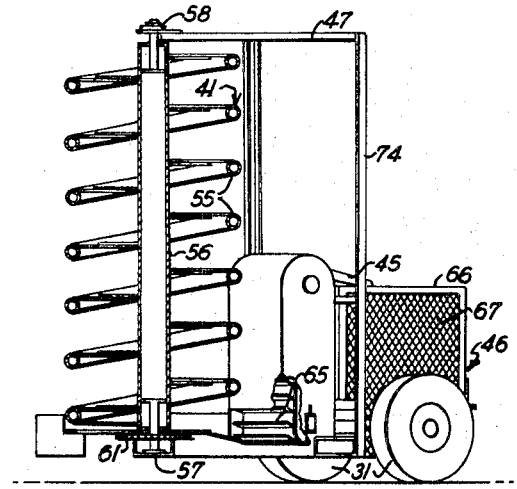
FIG. 3 is a perspective view of the mobile harvester shown in FIGS. 1 and 2 with the spiral structure shown in cross section taken on lines III—III of FIG. 1.
Figure 2:
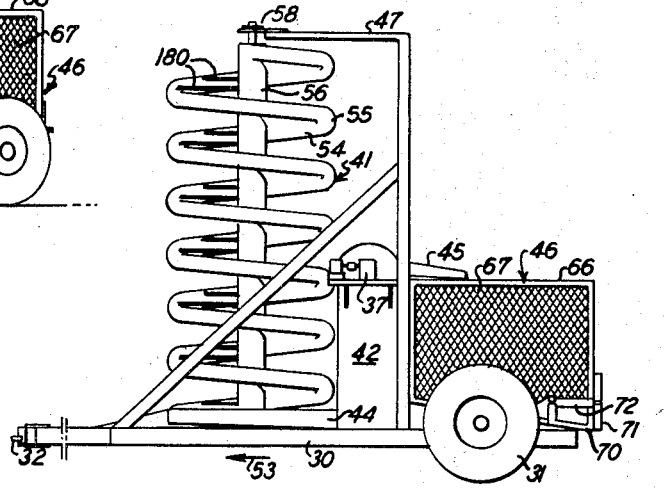
FIG. 2 is a left side elevational view of the mobile fruit harvester shown in FIG. 1.
Figure 4:
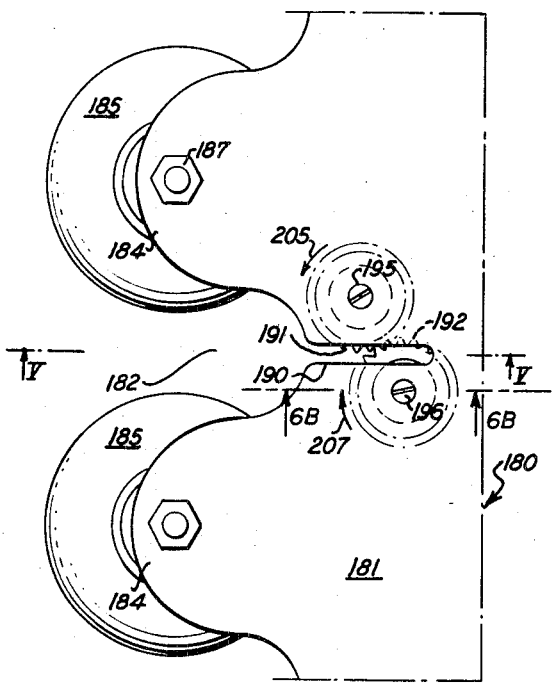
FIG. 4 is a top fragmentary detail view of the fruit-clipping attachment of the invention.
Figure 6A:
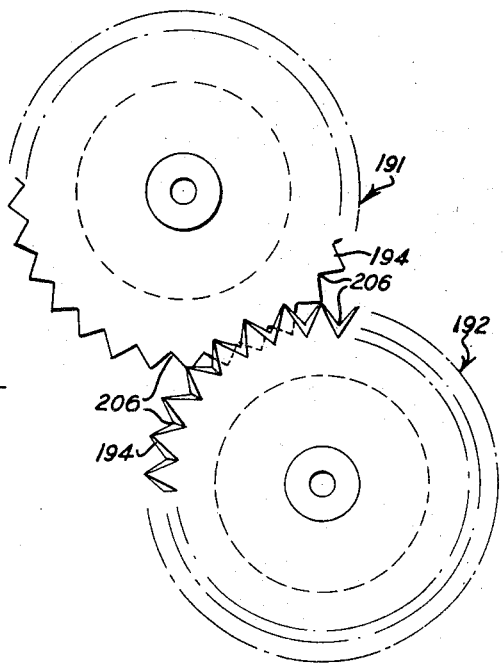
FIG. 6A is a top view showing the cutter blades used in the invention.
Figure 5:
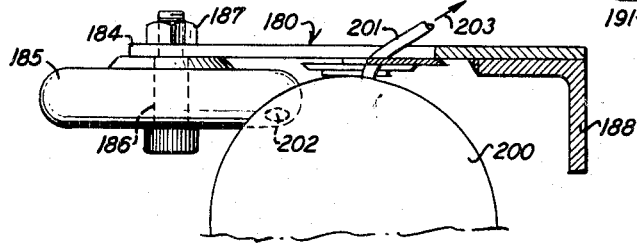
FIG. 5 is a side sectional view taken on lines V—V of FIG. 4 with a fruit member added.
Figure 6B:
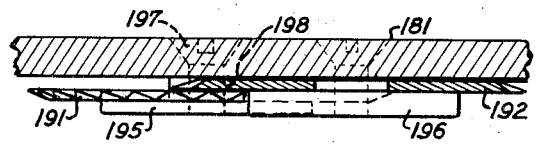
FIG. 6B is a side detail sectional view of the cutter blades of the invention taken on lines 6B—6B of FIG. 4.
Figure 7A:
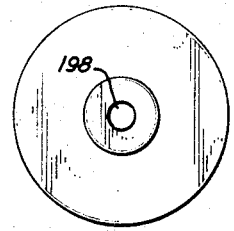
FIG. 7A shows, in top view, an arbor bushing for retaining the cutter blades in their overlapping position.
Figure 7B:
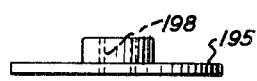
FIG. 7B is a side view of the arbor bushing for the lower blade.
Figure 7C:
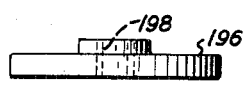
FIG. 7C is a side elevational view of the arbor bushing for the upper cutter blade.

Referring now to FIGS. 4 and 5, it is to be seen that the horizontal picking attachment 180 comprises a flat piece of metal 181 which is secured at one end to the center pipe 56 and on its other end to the spiral pipe 55 (FIGS. 1–3). The forward portion of the piece 181 is undulated to present a series of rounded slots 182 and rounded protrusions, or fingers, 184. For the purpose of picking oranges, the slots 182 preferably have radii of approximately ¾ of an inch. The protrusions 184, which for the same purpose have radii of approximately 1¼ inches, have mounted thereon rubber rollers 185 which are rotatably received on axles 186 secured to the protrusions 184 by self-locking nuts 187. At the rear of the slot 182 is a narrower slot, termed herein a stem channel 190, which is approximately ¼ inch wide and 1¼ inches long. A radial support 188 is welded or otherwise secured on the rear edge of piece 181.

To serrated disc cutter blades 191 and 192 are mounted on the underside of piece 181, one on each side of, and extending partly under, stem channel 190. For orange picking, each blade 191 and 192 is approximately 1¼ inches in diameter and the teeth 194, disposed along the periphery of each cutter blade 191 and 192, extend outwardly about 1/16 inch. Blades 191 and 192 are beveled on one side of each blade and flat on the other. They are sharpened on the beveled side and each tooth is sharpened on for cutting purposes from point to root. Blade 191 is mounted forward of blade 192 and the distance from center to center between the blades is less than the diameter of a circle through the roots of the teeth 194 so that the blades overlap to present complete shearing edges. The blades 191 and 192 have their flat sides adjacent to provide a good shear line. They are mounted on arbor bushings 195 and 196 which are secured to the undersides of the piece 181 by means of a flat head socket screw 197 received in threaded apertures 198 and which permit the free rotation of the blades 191 and 192. The design of each arbor bushing 195 and 196 is such as to provide that the blades are held in a sufficiently close overlapping position to produce good shear action but still loose enough to permit each blade to be turnable freely and independently of the other blade.

As the moving rotor member 41 engages the outer two to four feet of the canopy of the tree bearing fruit, a fruit member designated 200 (FIG. 5) is received in its upper portion by the rollers 185 and its stem 201 is guided first into the slot 182 and then into the stem channel 190. At such point the position of the fruit member 200 is more or less perpendicular due to the relative pull on stem 201 which urges the fruit 200 against the rollers, the contact between the fruit 200 and rollers 185 being designated by reference numeral 202. Fruit missed by one of the slots 182 of one attachment member 180 is likely to be engaged by the succeeding attachment member 180. As the limb having fruit member 200 pulls it in a direction shown by arrow 203, in a relative sense, into the stem channel 190, stem 201 first contacts blade 191 causing it to rotate in a direction indicated by arrow 205 and the stem positions itself between two teeth 194. As it moves to the rearward, stem 201 is brought into contact with the blade 192 where it also positions itself between two teeth 194 of such blade so that at this point it is surrounded by two pairs of teeth. As the rearward stem motion continues, the roots 206 between the engaging teeth 194 are brought together with blade 192 rotating in the direction of arrow 207 and eventually roots 206 intersect to complete the shearing of the stem 201. It will be appreciated that there are four contacting edges which shear the stem with a sliding action as the blades 191 and 192 are rotated. When the stem 201 separates, fruit member 200 falls to the underlying bottom portion 54, descends to catch basin 44 and finally is received in the temporary storage bin 46, as previously described.

Unless the fruit has a diameter greater than that of the slot 182, it is unlikely that its stem will be drawn into the stem channel 190. For this reason, the inadvertent cutting of immature young fruit on the tree and of leaves is largely avoided.

Figure 8A:
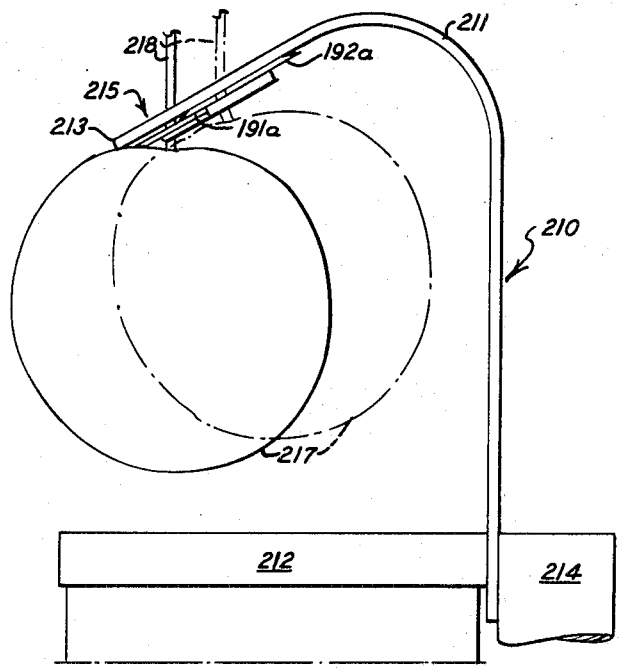
FIG. 8A is a side view of a manual attachment illustrating receipt of a fruit member therein.
Figure 8B:
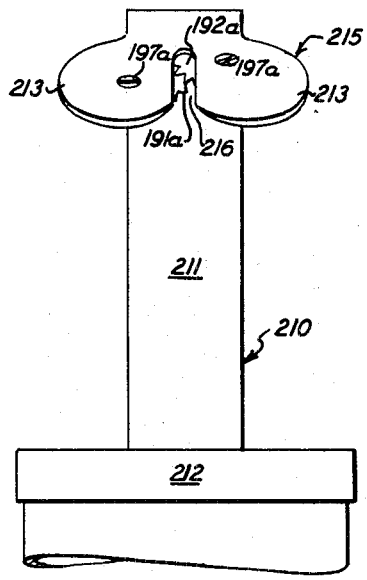
FIG. 8B is a front elevational view of the fruit picker shown in FIG. 8A.
Figure 8C:
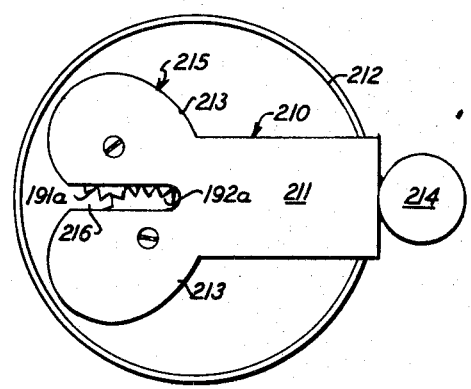
FIG. 8C is a top view of the picking attachment shown in FIGS. 8A and 8B.

FIGS. 8A, 8B and 8C show a manually operated fruit-clipping attachment. This implement, designated generally 210, comprises a flat piece of metal formed into a hook member 211 which is connected at its lower end to a chute 212 and a long handle 214. The chute 212 functions to catch fruit clipped by the implement 210 and the handle 214 is sufficiently long to permit the operator to extend the implement into the upper portions of the tree's canopy. These components are not described in detail since they are conventional and well known in the field to which the invention pertains. On the other end of the hook member 211 is a cutter head 215 in which, between projections 213, there is a narrow slot 216 which is about ¼ inch wide and approximately 1¼ inches long. Slot 216 is similar to the stem channel 190 and has attached at its lower side blades 191a and 192a, which are identical with the blades described with reference to FIG. 4 and are connected to projections 213 in the same manner as blades 191 and 192 are connected to piece 181. Moreover, they have the same dimensional relationship with the slot 216 as the blades 191 and 192 have with the stem channel 190 and a more detailed description would be repetitious.

A fruit member 217 is picked from a fruit tree by first placing hook member 211 over a fruit member 217 with its stem 218 received in slot 216. As implement 210 is moved forward, stem 218 contacts the front serrated cutter blade 191a and the stem 218 automatically positions itself in the roots between two teeth of such blade. The continued forward motion of the implement causes the front blade 191a to rotate to the rearward and as the stem 218 is thus brought to the rear serrated cutter blade 192a, stem 218 positions itself in a further root between two teeth of the latter blade so that it is surrounded by two pairs of teeth. As additional force is applied by the operator, the two cutter blades 191a and 192a shear the stem 218 at the point of contact, the shear position of the fruit member 217 and the stem 218 being shown in broken lines in FIG. 8A. When a stem 218 separates, the fruit 217 drops into the chute 212 and rolls down therein to a position where it may be collected by the operator in a manner well known to the art. Since the shearing action resulting from the sliding contact of four blade areas is accomplished with sufficient facility merely by moving the hook member 211, hand linkage to operate blades 191a and 192a, common in contemporary pickers, is not necessary. The implement is light in weight and its ease of manipulation permits the operatr to pick a relatively large number of fruit in a short period of time.

I have described preferred embodimnts of my invention, but it is to be understood that it is capable of other adaptations and modifications.

Having thus described my invention, what I claim as new and desire to secure by Letters Patent of the United States is:

1. A fruit harvester which comprises a mobile frame (30) and a plurality of fruit-picking means (180) extending outwardly from said frame adapted to comb horizontally through a fruit-bearing plant when said frame moves past said plant, said fruit-picking means including cutting means (191, 192) for cutting the stems of fruit of said fruit-bearing plant and a stem receiving channel (190) whereby said fruit is severed therefrom in said channel, said cutter comprising a freely rotatable cutting means, a portion of whish extends into said channel whereby the stems of fruit entering said channel are severed by said cutting means.

2. A fruit harvester in accordance with claim 1, wherein said fruit-picking means are mounted on a rotor (41) adapted to rotate through the canopy of said plant.

3. A fruit harvester in accordance with claim 1, wherein said fruit-picking means are staggered relative to each other whereby the fruit-picking means immediately higher than the next lower of said fruit-picking means is also immediately to the rear of said next lower of said fruit-picking means.

4. A fruit harvester in accordance with claim 1, wherein said fruit-picking means includes bar means (181), a plurality of slots (182) spaced along the edge of said bar means, said slots being of sufficient width to receive the stems of a selected type of said fruit sufficiently narrow that matured fruit of said selected type does not pass through said slots, each of said slots including at least one said channel (190), said channel having said cutting means extending relative thereto adapted to sever a stem which is moving along said channel as said fruit-picking means moves through a fruit-bearing plant.

5. A fruit harvester in accordance with claim 1, wherein said cutting means comprises a serrated disc, the serrations of said disc being adapted to receive stems of said plants, said disc being rotated by the relative motion between said stems and said fruit-picking means.

6. A fruit harvester in accordance with claim 5, wherein said cutting means comprises a further serrated disc overlapping said first mentioned serrated disc.

7. A fruit harvester in accordance with claim 1 including rollers (185) associated with said channel (190) whereby fruit within said channel is held substantially perpendicular when said stem is severed by said cutting means by movement of said fruit-picking means.

8. A fruit harvester which comprises a mobile frame (30), vertical rotatable means (41) mounted on said frame, and a plurality of fruit-picking means (180) extending outwardly from said rotatable means, said fruit-picking means including freely rotatable cutting means (191, 192) and a stem receiving channel (190), said cutting means including a portion extending into said channel which is adapted to sever the stems of the fruit being harvested as the stems thereof enter said channel, whereby fruit is severed from a fruit-bearing plant as said fruit-picking means are rotated by said rotatable means through the canopy of a fruit-bearing plant.

9. A fruit harvester in accordance with claim 8, wherein a fruit-conveying means underlies said fruit-picking means and comprises a spiral chute.

10. A fruit-picking attachment which comprises a supporting member (181), a plurality of projection means (184) extending forwardly of said supporting means, said projection means defining a plurality of slots (182, 190) of sufficient width to receive stems of a selected type of fruit intended for picking by the attachment, separating means (191, 192) in said slot, said separating means comprising freely rotatable cutting means extending into said slot, and holding means (185, 202) on said projections whereby when said attachment is moved through a fruit-bearing plant, fruit thereon is severed from its stem by said cutting means while being held in said slot by said holding means whereby said stem is parted from said fruit immediately above its calyx.

11. A mechanism in accordance with claim 10 comprising a mobile frame (30) in which are mounted a plurality of said attachments (180).

12. A mechanism for picking a selected type of fruit which comprises a pair of forwardly extending projections (184) defining therebetween a slot (182, 190) which is of sufficient width to receive the stems of said fruit and sufficiently narrow to prevent passage of said fruit therethrough, freely rotatable cutting means (191, 192) disposed across said slot, holding means (185) provided on each of said projections forwardly of said cutting member adapted to hold said fruit substantially perpendicular when said stem moves rearwardly relative to said projections, the arrangement being that said stem is cut immediately above its calyx by said cutting means while said fruit is received in said slot and disposed in a substantially perpendicular position by said holding means.

13. A mechanism in accordance with claim 12, wherein said holding means comprises rotatable members.

14. A mechanism in accordance with claim 13, wherein said rotatable members are rotatable about an axis generally perpendicular to said projections.

15. A mechanism in accordance with claim 13, wherein said holding means are composed of a pliant material.

16. A mechanism in accordance with claim 12, including means (41) for rotating the mechanism through the canopy of a plant bearing said fruit.

17. In a fruit-picking device, a pair of projections (184, 213), a slot (182, 216) between said projections of sufficient width to receive the stems of fruit intended for harvesting and sufficiently narrow so that the fruit intended for harevsting does not pass through said slots, and a pair of rotatable disc cuters (191, 192, 192a) on said projections overlapping each other below said slot, at least one of said cutters being freely rotatable and serrated, whereby a stem of fruit entering said slot is severed by said cutters.

18. The subject matter of claim 17, wherein said serrated cutter (191, 191a) has a forward position with respect to the other of said cutters (192, 192a), a stem in said slot moving within the serrations of the said serrated cutter into the other of said cutters where it is severed.

19. The subject matter of claim 17, wherein both of said cutters are serrated.

20. The subject matter of claim 17, wherein the device is mounted on extension means (214) and includes catching means (212) to receive the picked fruit.

21. A fruit harvester which comprises a mobile frame (30), vertical rotatable means (41) mounted on said frame, and a plurality of fruit-picking means (180) extending outwardly from said rotatable means, said fruit-picking means including cutting means adapted to sever the stems of the fruit being harvested, whereby fruit is severed from a fruit-bearing plant and said fruit-picking means are rotated by said rotatable means through the canopy of a fruit-bearing plant, said fruit-picking means including bar means (181), a plurality of slots (182) spaced along the edge of said bar means, said slots being of sufficient width to receive the stems of a selected type of said fruit and sufficiently narrow that matured fruit of said selected type does not pass through said slots, each of said slots including a channel (190), said channel including cutting means (191, 192) extending relative thereto adapted to sever a stem which is moving along said channel as said fruit-picking means moves through a fruit-bearing plant, said cutting means comprising a pair of serrated rotatable cutting blades which are in overlapping relationship with each other under said slot.

22. A fruit harvester in accordance with claim 21, wherein one of said blades is disposed forwardly with respect to the other of said blades whereby a stem of the fruit being harvested will normally engage the forward blade first.

References Cited

UNITED STATES PATENTS

| | | | |
|---|---|---|---|
| 908,235 | 12/1908 | Frampton | 56—339 |
| 1,225,097 | 5/1917 | Young | 56—339 |
| 1,588,034 | 6/1926 | Koehler | 56—339 |
| 2,603,056 | 7/1952 | Mellinger et al. | 56—338 |
| 3,164,944 | 1/1965 | Polk | 56—338 |
| 3,410,068 | 11/1968 | Recker | 56—332 |
| 3,420,312 | 1/1969 | Greedy | 56—327 |

LOUIS G. MANCENE, Primary Examiner

J. A. OLIFF, Assistant Examiner